(12) United States Patent
Andersson et al.

(10) Patent No.: US 7,455,316 B2
(45) Date of Patent: Nov. 25, 2008

(54) AIR-BAG ARRANGEMENT

(75) Inventors: Stefan Andersson, Alingsås (SE); Jan Svanberg, Alingsås (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 11/579,031

(22) PCT Filed: Apr. 14, 2005

(86) PCT No.: PCT/SE2005/000535

§ 371 (c)(1),
(2), (4) Date: Oct. 30, 2006

(87) PCT Pub. No.: WO2005/105529

PCT Pub. Date: Nov. 10, 2005

(65) Prior Publication Data

US 2008/0001387 A1    Jan. 3, 2008

(30) Foreign Application Priority Data

May 5, 2004    (GB) ................. 0410055.8

(51) Int. Cl.
*B60R 21/16* (2006.01)
(52) U.S. Cl. .................................... 280/731
(58) Field of Classification Search ............ 280/731, 280/728.2
See application file for complete search history.

(56) References Cited

U.S. PATENT DOCUMENTS

| 5,695,214 | A | 12/1997 | Faigle et al. |
| 6,588,795 | B2 | 7/2003 | Fischer et al. |
| 6,736,425 | B2 | 5/2004 | Lemon et al. |
| 6,758,489 | B2 * | 7/2004 | Xu .......................... 280/728.1 |
| 6,843,503 | B2 | 1/2005 | Ford |
| 2002/0089159 | A1 | 7/2002 | Fischer et al. |
| 2003/0141706 | A1 | 7/2003 | Lemon et al. |
| 2003/0222442 | A1 | 12/2003 | Ford |

OTHER PUBLICATIONS

International Search Report for PCT/SE2005/000535, ISA/SE, Stockholm, mailed Jun. 27, 2005.
Search Report under Section 17 for GB 0410055.8, UK, dated Jul. 19, 2004.

* cited by examiner

*Primary Examiner*—Faye M. Fleming
(74) *Attorney, Agent, or Firm*—Harness, Dickey & Pierce, P.L.C.

(57) ABSTRACT

An air-bag arrangement is disclosed which comprises an air-bag (21), an aperture (22) communicating with the interior of the air-bag (21), and a gas generator (23) to generate gas to inflate the air-bag (21). The gas generator (23) is mounted for pivotal movement about a pivot axis extending across the aperture (22) so that the gas generator (23) is pivotally moveable between a closed position in which at least part of the gas generator (23) extends across the aperture (22), to close the aperture (22), and an open position in which said aperture (22) is opened to permit the flow of gas from the air-bag (21).

16 Claims, 8 Drawing Sheets

AIR-BAG ARRANGEMENT

THE PRESENT INVENTION relates to an air-bag arrangement, and more particularly relates to an air-bag arrangement adapted to be controllably vented.

It is known that it is desirable to vent an air-bag provided for use in a motor vehicle to protect an occupant of the vehicle in the event that an accident should occur, especially if the air-bag is of the type intended to provide protection in the event that a front impact should occur.

An air-bag that is intended to provide protection in the case that a front impact should occur is generally located so that, when inflated, the air-bag is positioned in front of the occupant to be protected. During the front impact the vehicle decelerates suddenly. Due to inertia, the occupant of the vehicle tends to continue moving, and thus the occupant of the vehicle is, in effect, moving forwardly relative to the rest of the vehicle. The function of the air-bag is to decelerate the occupant, preferably in such a way that the occupant suffers no injury. The air-bag must be inflated very swiftly and thus, typically, contains relatively high-pressure gas. If the air-bag were not vented, then because of the high gas pressure within it, the air-bag would not decelerate the occupant gently, but instead would stop the occupant extremely swiftly and hence may injure the occupant. Thus many air-bags are provided with vent holes formed in them so that, when the air-bag is struck by the occupant, gas can escape from the air-bag through the vent hole or holes, so that the air-bag serves the function of decelerating the occupant more gently, to avoid such injury.

In many cases it is desirable to be able to control the degree of venting, or the time at which venting commences. For example, if an occupant of a seat is out of the ordinary seating position and is, for example, leaning forwardly, then it is desirable to commence venting of the air-bag at a very early stage during its inflation, so that the air-bag itself does not injure the occupant that the air-bag is intended to protect. Varying degrees of venting may be desirable depending upon the weight and/or size of the occupant to be protected by the air-bag.

Various mechanisms have been proposed previously for the controllable venting of an air-bag.

GB 2,389,342 A discloses an arrangement comprising an air-bag which defines an opening communicating with the interior of the air-bag which is, in the region of the opening, secured to a support plate. The support plate defines an aperture which is aligned with the opening of the air-bag. A gas generator is provided which is hingedly connected at a peripheral point to the support plate and which can therefore move outwardly from a closed position in which it covers the aperture and thus prevents gas from escaping from the interior of the air-bag through the aperture, to an open position in which the gas generator uncovers the aperture to allow gas to escape from the interior of the air-bag. A retainer is provided which retains the gas generator in its initial closed position and which can be activated by a signal from an appropriate sensor or control unit to release the gas generator. When the gas generator is activated and the air-bag starts to inflate, a signal may be sent to the retainer to release the gas generator such that the pressure of the gas within the air-bag forces the gas generator to move outwardly from the aperture about the hinge, and allow gas to vent from the interior of the air-bag through the aperture.

The present invention seeks to provide an improved air-bag arrangement.

According to the present invention, there is provided an air-bag arrangement comprising:

an air-bag; an aperture communicating with the interior of the air-bag;

and a gas generator to generate gas to inflate the air-bag; wherein the gas generator is mounted for pivotal movement about a pivot-axis extending across the aperture, such that the gas generator is pivotally moveable between a closed position in which at least part of the gas generator extends across the aperture to close the aperture, and an open position in which said aperture is opened to permit the flow of gas from the air-bag.

Preferably, the gas generator is mounted such that, during movement from its closed position to its open position, part of the gas generator moves inwardly of the aperture and part of the gas generator moves outwardly of the aperture.

Advantageously, the gas generator is configured so that gas pressure within the airbag resulting from actuation of the gas generator creates a resultant torque acting to urge the gas generator from its closed position towards its open position.

Conveniently, the gas generator is configured so that gas pressure within the airbag resulting from actuation of the gas generator creates a substantially zero resultant torque acting on the gas generator when the gas generator is in its closed position.

Preferably, the aperture is formed through an element, said element presenting an inner surface towards the interior of the air-bag, said gas generator having an outwardly directed flange region on one side of the pivot-axis which engages the inner surface when the gas generator is in the closed position.

Advantageously, the gas generator is provided with a second outwardly directed flange region on the other side of the pivot-axis which engages an outer surface of the element when the gas generator is in the closed position.

Conveniently, the pivot-axis cuts the area presented by the aperture into two unequal areas, the smaller area being on the same side of the pivot-axis as the first flange region.

Preferably, the aperture is substantially square.

Advantageously, the air-bag arrangement is provided with a retainer to hold the gas generator in the closed position.

Conveniently, the retainer is releasable, and is actuable in response to a signal so as to release and allow the gas generator to move to the open position.

Preferably, the retainer comprises at least one frangible element which is configured to break in response to a predetermined torque acting on the gas generator.

Advantageously, the arrangement is provided with an opening arrangement to drive the gas generator from the closed position to at least a partially open position.

Conveniently, the opening arrangement comprises an expandable element which is actuable in response to a signal.

Preferably, the opening arrangement comprises a spring.

Advantageously, the air-bag arrangement is provided in a vehicle steering wheel mounted to the structure of the vehicle, said opening arrangement comprising an element forming part of the structure and being configured to drive the gas generator from the closed position to at least said partially open position in response to relative motion between the steering wheel and the structure of the vehicle.

Conveniently, the air-bag arrangement is provided in a vehicle steering wheel mounted to the structure of the vehicle, said structure being provided with an element configured to drive the gas generator from an at least partially open position to a substantially closed position in response to relative motion between the steering wheel and the structure of the vehicle.

In order that the invention may be more readily understood, and so that farther features thereof may be appreciated, embodiments of the invention will be described, by way of example, with reference to the accompanying drawings in which.

Figure 1:
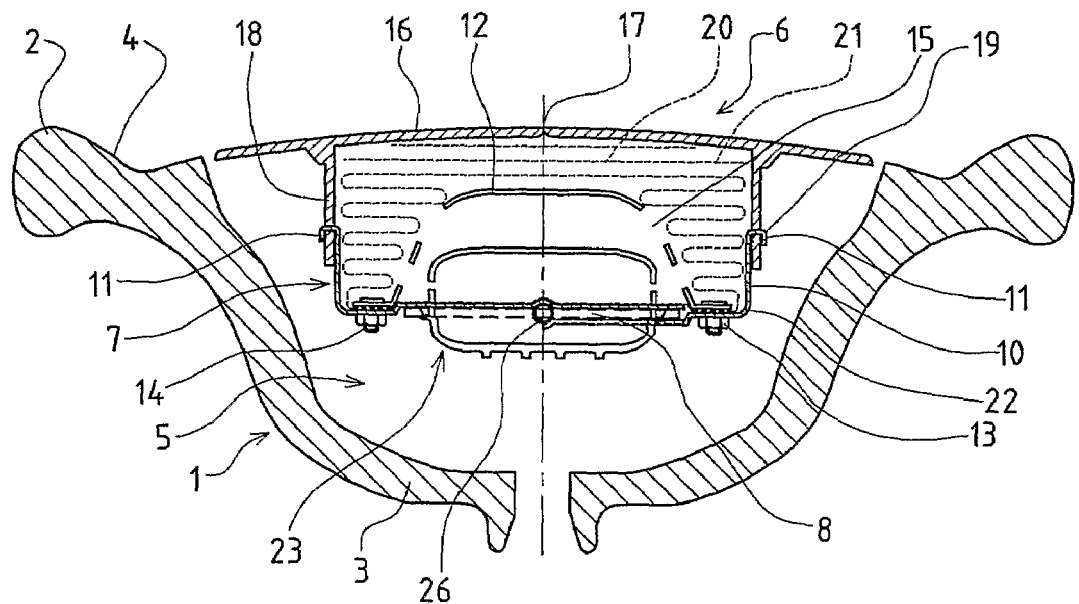
FIG. 1 is a transverse sectional view of part of an air-bag arrangement in accordance with the invention, illustrating part of an air-bag unit in position in a recess of a steering wheel.
Figure 2:
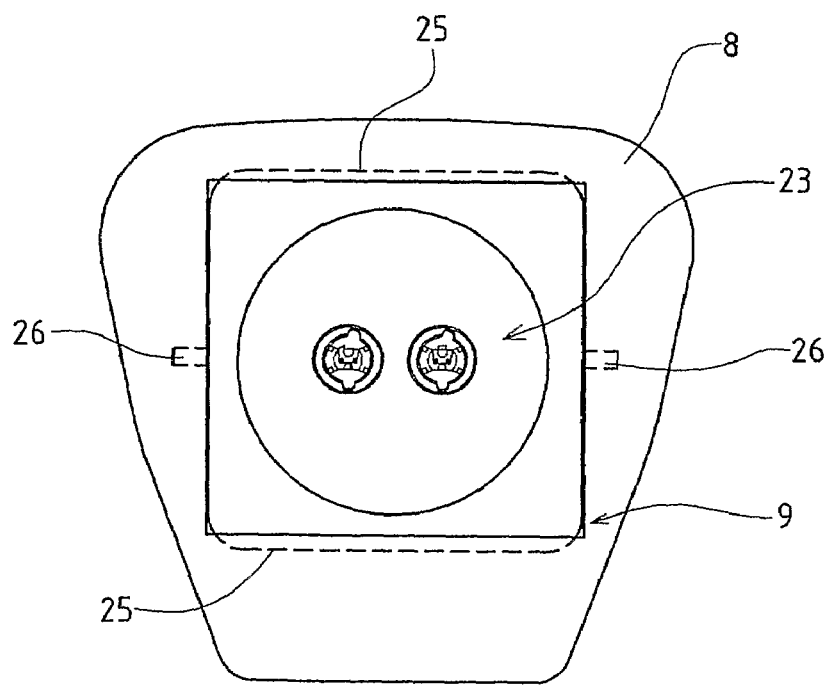
FIG. 2 is an exterior plan view of the underside of part of the air-bag unit of FIG. 1, illustrating an aperture plate and an underside of a gas generator in a closed position.

Referring initially to FIGS. 1 and 2 of the accompanying drawings, an air-bag arrangement in accordance with the present invention is illustrated. The arrangement is incorporated in a steering wheel 1 having a rim portion 2, and a central hub 3 configured to mount the steering wheel 1 to the steering column (not shown) of a vehicle. A plurality of spokes 4 interconnect the rim 2 and the hub 3, and define a central recess 5.

Within the recess 5, there is provided an air-bag unit 6 which comprises a housing 7, mounted to the central hub 3 of the steering wheel 1. The housing 7 comprises a base plate 8 through which a substantially square vent aperture 9 is provided as illustrated most clearly in FIG. 2. A peripheral housing wall 10 extends forwardly from the base plate 8 and terminates with a peripheral rim having at least two outwardly directed hook formations 11.

The housing 7 is preferably pressed from a single sheet of metal.

An outwardly dished baffle plate 12 is provided which has a planar, outwardly extending lower rim portion 13. The rim portion 13 bears against the inner surface of the base plate 8, around the periphery of the vent aperture 9. The baffle plate 12 is mounted to the base plate 8 at a position above the vent aperture 9 by means of retaining bolts 14 passing through aligned holes formed through the rim portion 13 of the baffle 12 and through the base plate 8. The dished region of the baffle plate 12 is provided with a plurality of flow ports 15 in the form of simple apertures through the plate.

The air-bag unit 6 further comprises a cover 16 which extends across the steering wheel recess 5 and which presents an outwardly directed generally smooth surface. The cover 16 is provided with a central region of relative mechanical weakness which is configured so as to define a break-line 17 running across the central region of the cover 16. From the undersurface of the cover 16, there projects a downwardly directed wall 18 which extends into the steering wheel recess 5. The lowermost region of the wall 18 is provided with at least two retaining apertures 19. The cover 16 is preferably moulded from a plastics material.

The cover 16 is fixedly attached to the housing 7 by means of engagement between the hook formations 11 of the peripheral base wall 10 and the retaining apertures 19 formed through the wall 18.

It will therefore be seen from FIG. 1 that the undersurface of the cover 16, the inner surface of the cover wall 18, the inner surface of the peripheral base wall 10 and the outer surface of the baffle plate 12 together form a chamber 20 which is closed apart from in the regions of the flow ports 15.

An air-bag 21 is provided within the chamber 20 in an initially folded condition, as illustrated in FIG. 1, and has an inlet aperture 22 through which gas can communicate with its interior. The edge of the inlet aperture 22 is sandwiched between the rim portion 13 of the baffle plate 12 and the inner surface of the base plate 8 and is retained in position through the clamping action of the bolts 14. Therefore, it is to be appreciated that the baffle plate 12, due to its dished configuration, extends part-way into the interior of the air-bag 21, with the air-bag 21 being initially folded around the baffle plate 12.

Mounted within the vent aperture 9 of the base plate 8 is a gas generator 23. The gas generator 23 is provided with a generally cylindrical housing which has a plurality of gas outlet apertures 24. The housing of the gas generator 23 is dimensioned to pass through the vent aperture 9 in the base plate 8 and through the aligned inlet aperture 22 in the air-bag 21 so that the gas outlet apertures 24 are located within the interior of the air-bag 21, and within the dished region of the baffle plate 12.

The gas generator 23 is provided with a radially outwardly extending-flange plate 25 of generally square form (as illustrated in phantom in FIG. 2).

The gas generator 23 is pivotally mounted to the base plate 8, across the vent aperture 9, by virtue of a pair of co-axial pivot pins 26 which extend outwardly from either side of the plane of the flange plate 25 of the gas generator 23, and which are rotatably engaged within respective sockets formed on the base plate 8, on opposite sides of the vent aperture 9. It should therefore be appreciated that the axis of the pivot pins 26 defines a pivot axis 27, extending across the vent aperture 9 and which passes substantially through the centre of the gas generator 23.

FIG. 1 shows the gas generator 23 in a closed position in which it extends substantially across the vent aperture 9. FIG. 2 shows that in this closed position, the flange plate 25 substantially seals with the base plate 8 around the peripheral regions of the vent aperture 9 to substantially prevent gas from passing through the vent aperture 9.

It is to be appreciated that in an accident situation, the gas generator 23 is actuated upon receipt of an actuation signal from a crash sensor or the like (not shown) so as to expel a large volume of gas through the gas outlet apertures 24 into the dished region of the baffle plate 12. The gas is then able to pass through the flow ports 15, located in the dished wall of the baffle plate 12, and into the interior of the air-bag 21. As the air-bag 21 begins to inflate, it applies an increasing pressure against the inner surface of the cover 16 until the breakline 17 ruptures. The air-bag 21 is then able to burst out of the air-bag unit 6 to its fully deployed state as illustrated in FIG. 3.

Figure 3:
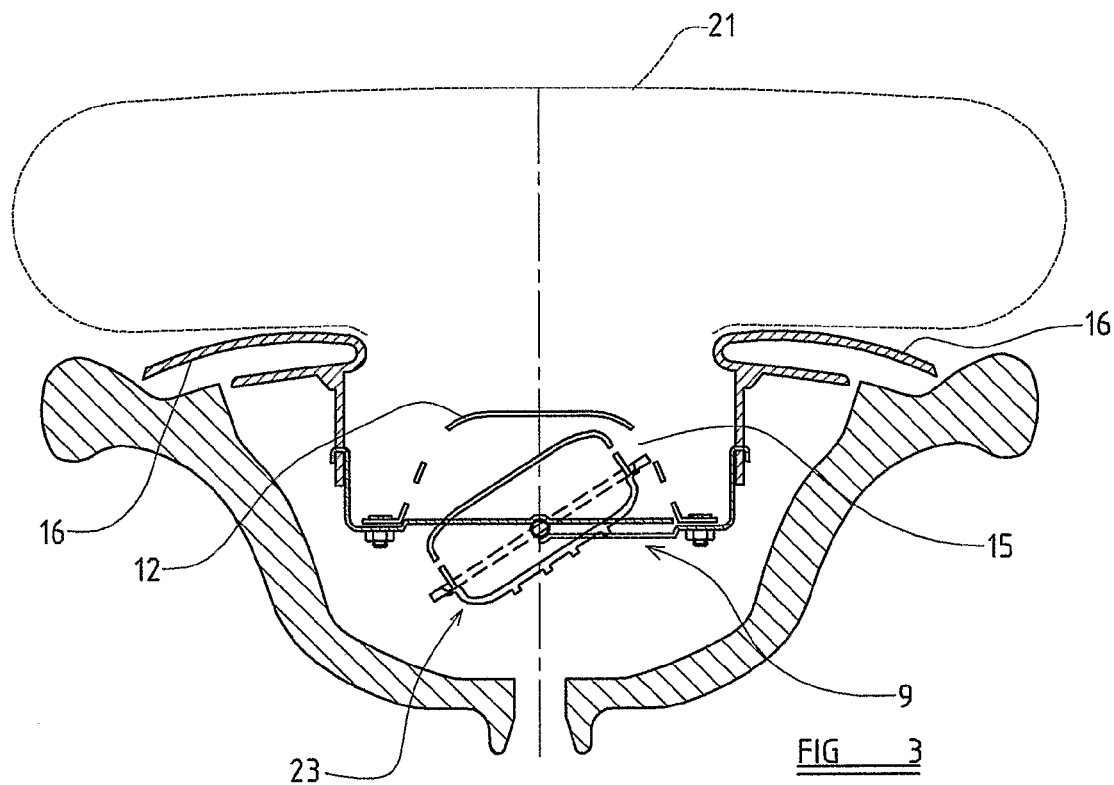
FIG. 3 is a view corresponding generally to FIG. 1, but illustrating an air-bag of the air-bag unit in its deployed state.
Figure 4:
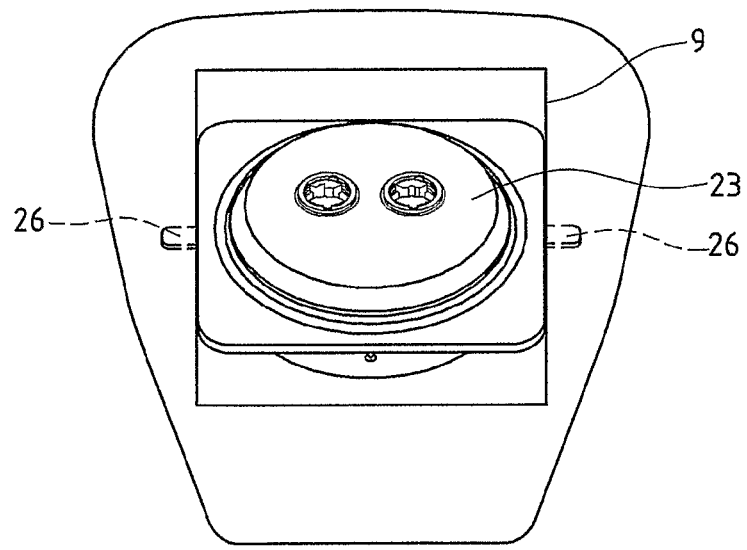
FIG. 4 is a view corresponding generally to FIG. 2, but illustrating the gas generator in an alternate, open position.

It is to be appreciated that due to the pivotal manner in which the gas generator 23 is mounted within the vent aperture 9, the gas generator 23 can rotate or be rotated from the initial closed position shown in FIGS. 1 and 2, to an open position as illustrated in FIGS. 3 and 4, so as to open the vent aperture 9. This opening of the vent aperture 9 will be described in more detail below, but it should be clear from FIGS. 3 and 4 that as the gas generator 23 moves from its closed position to its open position, it does so pivotally and such that part of the gas generator 23 moves inwardly of the vent aperture 9 and part of the gas generator 23 moves outwardly of the vent aperture 9.

Figure 5:
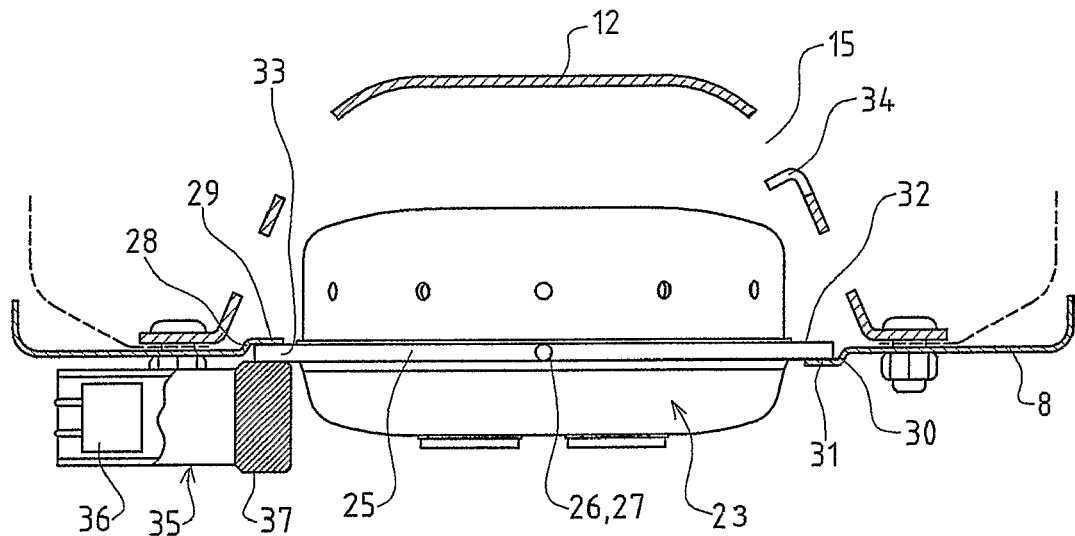
FIG. 5 is an enlarged transverse sectional view of part of the air-bag unit of FIG. 1, illustrating the gas generator in its initial closed position.
Figure 6:
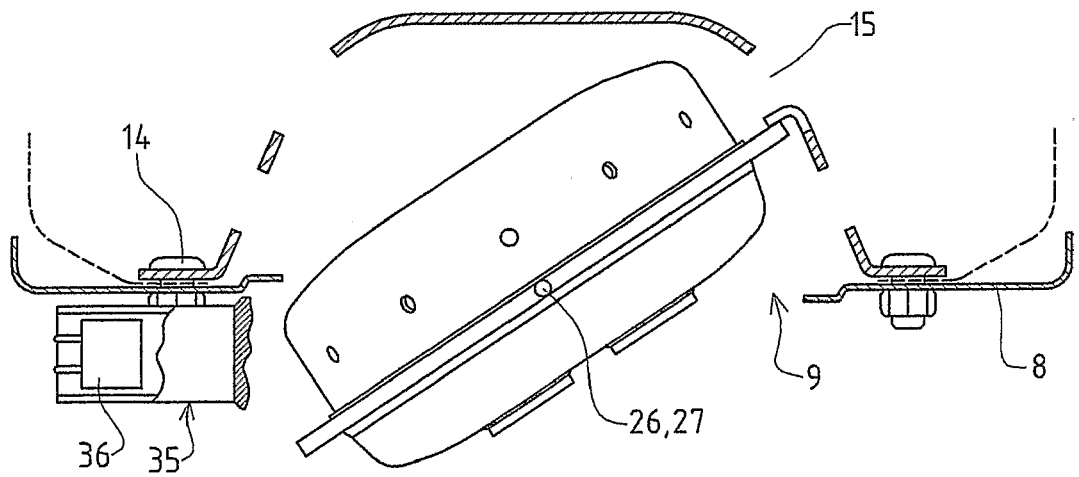
FIG. 6 is a view corresponding generally to FIG. 5, but illustrating the gas generator in an alternate, open position.

FIGS. 5 and 6 show enlarged views of the embodiment illustrated in FIGS. 1 and 3. It will be seen that along one edge region of the square-shaped vent aperture 9 of the base plate 8, an upward step 28 is formed which terminates in an upper lip 29. Along the opposing parallel edge region of the vent aperture 9 a downward, oppositely directed step 30 is formed which terminates in an lower lip 31. Therefore, the upper lip 29 and the lower lip 31 are each parallel with and spaced apart from the plane of the base plate 8, to respective sides of the base plate 8.

When the gas generator 23 is in the closed position, as illustrated in FIGS. 1, 2 and 5, a first edge region 32 of the flange plate 25 is in engagement with the inwardly-directed inner surface of the base plate 8 along the lower lip 31, and an opposed, parallel second edge region 33 of the flange plate 25 is in engagement with the outwardly-directed outer surface of the base plate 8 along the upper lip 29. It will be seen that because of the opposed and stepped nature of the lips 29 and 31, the flange plate 25 lies substantially co-planar with the base plate 8, sealing against the lips 29 and 31. Furthermore, it will be seen that the opposed, parallel edges of the flange plate 25 from which the pivot pins 26 project are in close proximity with the adjacent edges of the vent aperture 9 such that they provide a substantial seal with the vent aperture 9. Therefore, when the gas generator 23 is in the closed position, it extends substantially across the vent aperture 9 so as to prevent the flow of gas through the vent aperture 9.

It will also be seen from FIG. 5 that the baffle plate 12 is provided with a substantially planar stop formation 34 which projects inwardly towards the gas generator 23 from the wall of the dished region of the baffle plate 12, adjacent one of the flow ports 15. The plane of the stop 34 is directed generally towards the pivot axis 27. The stop 34 is preferably formed by bending part of the wall of the baffle 12 inwardly to define the flow port 15.

FIG. 5 further shows an actuable release mechanism 35 which comprises a squib 36 and a retainer 37. The actuable release mechanism 35 is bolted to the underside of the base plate 8 by means of one of the above-mentioned retaining bolts 14 in the region of the upper lip 29 of the base plate 8, such that the second edge region 33 of the gas generator 23 is sandwiched between the retainer 37 of the actuable release mechanism 35 and the upper lip 29 of the base plate 8. With the retainer 37 in this position, it will therefore be seen that pivotal movement of the gas generator 23 away from its closed position is prevented. Therefore, the gas generator 23 is retained in the closed position.

Upon receipt of an appropriate trigger signal, the squib 36 is configured to fire and cause the retainer 37 to break and become detached from the remainder of the actuable release mechanism 35.

FIG. 6 shows the release mechanism 35 after actuation as described above, and it will be seen that after detachment of the retainer 37, the second edge region 33 of the gas generator 23 is no longer sandwiched between the retainer 37 and the upper lip 29. The gas generator 23 thus becomes free to rotate out of its initial closed position, as also shown in FIG. 6.

It is to be appreciated that because the upper lip 29 engages with the second edge region 33 of the flange plate 25, and the lower lip 31 engages with the first edge region 32 of the flange plate 25 when in the closed position, the gas generator 23 is only permitted to rotate in one direction about the pivot axis 27 as illustrated in FIG. 6. Furthermore, the extent to which the gas generator 23 is permitted to rotate, and hence extend inwardly of the vent aperture 9 into the dished region of the baffle 12, is limited by the engagement of the first edge region 32 of the flange plate 25 with the stop 34 of the baffle plate 12, again as illustrated in FIG. 6.

It is to be appreciated that the position of the pivot axis 27 across the vent aperture 9 and the effective sealing areas defined by engagement between the flange plate 25 and the peripheral regions of the vent aperture 9 determine whether or not the pressure of the inflating gas acting on the interior surfaces of the gas generator 23 creates a resultant torque on the gas generator 23 about the pivot axis 27.

Figure 7:
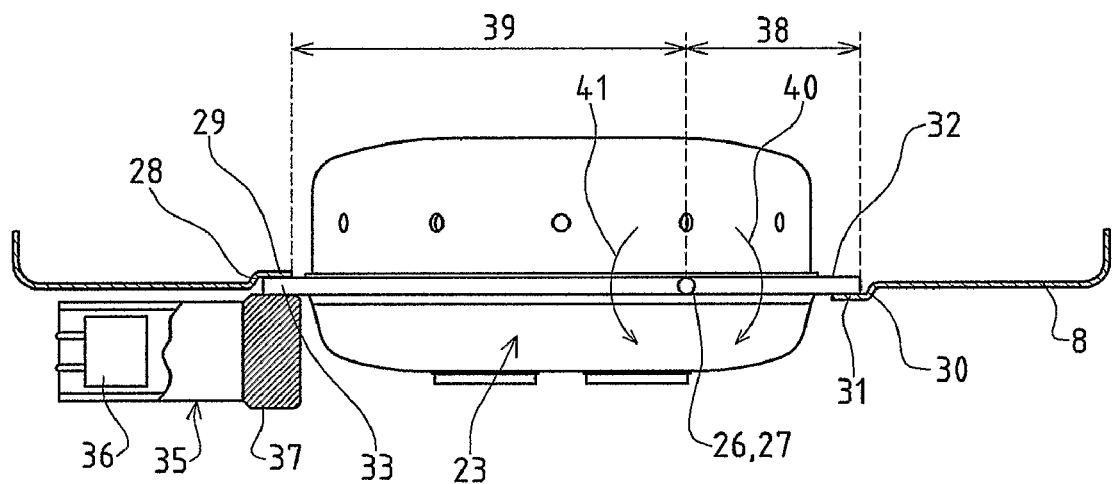
FIG. 7 is a transverse sectional view of a part of an arrangement in accordance with another embodiment of the invention, illustrating the gas generator in its initial closed position.
Figure 8:
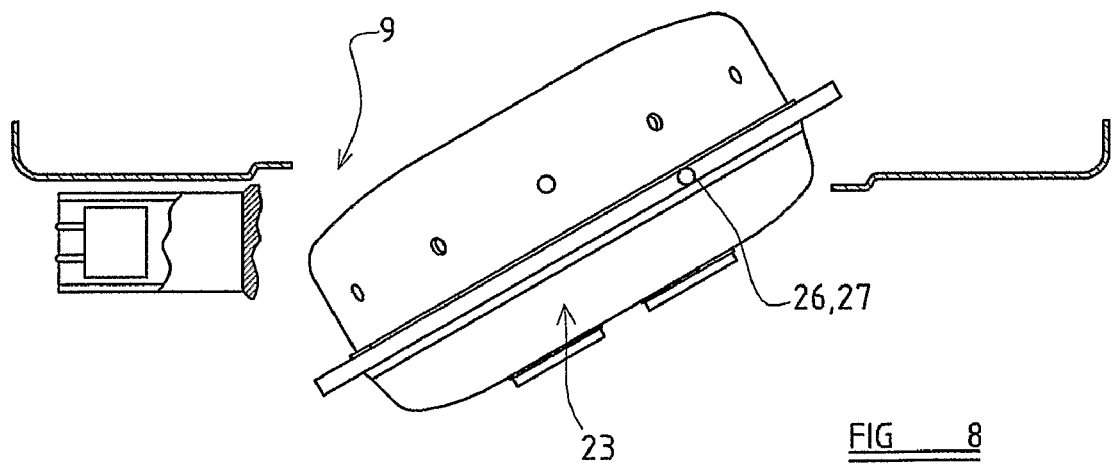
FIG. 8 is a view corresponding generally to FIG. 7, but illustrating the gas generator in an alternate, open position.

FIGS. 7 and 8 illustrate another embodiment of the invention, in which the pivot pins 26 of the gas generator 25 and their respective associated sockets formed on the base plate 8 are positioned so that the pivot axis 27 of the gas generator 23 extends across the vent aperture 9 at a position offset from the centre of the vent aperture 9. In the particular arrangement shown in FIG. 7, the pivot axis 27 lies nearer to the lower lip 31 than the upper lip 29.

When the gas generator 23 is in the closed position illustrated in FIG. 7, a first area 38 is defined by the pivot axis 27, and a first sealing line running along the interface between the flange plate 25 and the edge regions of the vent aperture 9 from one pivot pin 26 to the edge of the flange plate 25, along the edge of the flange plate 25, and from the edge of the flange plate 25 back to the opposite pivot pin 26. Similarly a second, larger area 39 is defined by the pivot axis 27, and a second sealing line running along the interface between the flange plate 25 and the edge regions of the vent aperture 9, from one pivot pin 26 to the edge of the upper lip 29, along the edge of the upper lip 29, and from the edge of the upper lip 29 back to the opposite pivot pin 26. It is therefore to be appreciated that the first and second areas 38, 39 define the parts of the gas generator 23 which are exposed to the gases within the interior of the air-bag 21 when the gas generator 23 is in the closed position.

The smaller, first area 38 is the effective area over which the pressure of the gas from within the interior of the air-bag 21 acts to generate a first resultant force, and hence generate a first torque acting about the pivot axis 27, and urging the gas generator 23 to rotate in a first direction indicated by the arrow 40 in FIG. 7.

The second, larger area 39 is the effective area over which the pressure of the gas from the interior of the air-bag 21 acts to generate a second resultant force, and hence generate a second torque acting about the pivot axis 27. The second torque acts to urge the gas generator to rotate in a second direction indicated by arrow 41 in FIG. 7. It should therefore be appreciated that the first and second torques oppose one another It is therefore to be appreciated that the relative positions of the sealing lines and the position of the pivot axis 27 across the vent aperture 9 determine the relative proportions of the effective areas 38 and 39, and hence whether or not a resultant torque acts on the gas generator 23 about the pivot axis 27, and if so, in which direction.

In the embodiment of the invention illustrated in FIG. 7, the offset of the pivot axis 27 from the centre of the vent aperture 9 is such that upon activation of the gas generator 23, the pressure of the inflating gas within the air-bag 21 acting on the interior surfaces of the gas generator 23 creates a resultant torque effective to urge the gas generator 23 to its open position. However, the gas generator 23 can only move to the open position illustrated in FIG. 8, and hence vent gas from the interior of the air-bag 21 through the vent aperture 9 once a signal has been sent to the squib 36 of the actuable release mechanism 35 to detach the retainer 37, and thus release the gas generator 23.

It is to be appreciated that during a crash, and after the gas generator 23 has been triggered, the timing of when, if at all, the squib 36 of the actuable release mechanism 35 is fired to release the gas generator 23 may depend on various factors such as, for example, the weight of the vehicle occupant, the position of the occupant immediately prior to the crash or whether or not the occupant is wearing a seat belt.

Figure 9:
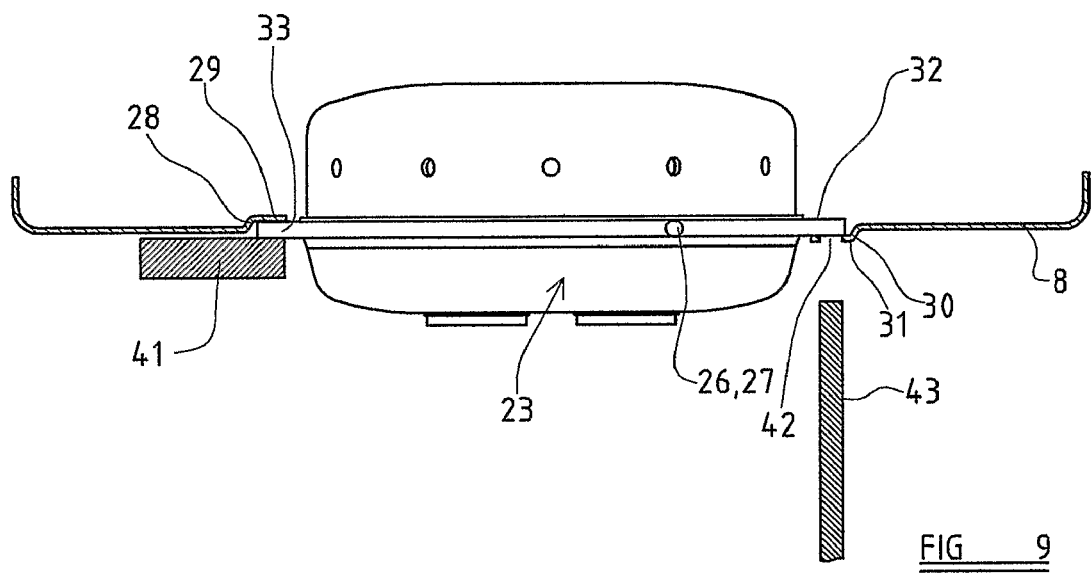
FIG. 9 is a transverse sectional view of a part of an arrangement in accordance with a further embodiment of the invention.
Figure 10:
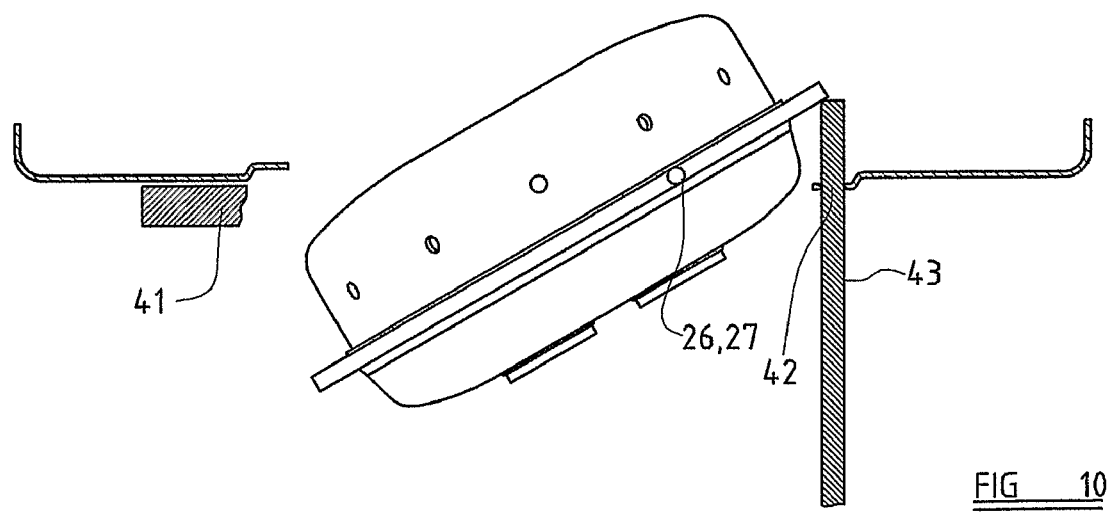
FIG. 10 is a view corresponding generally to FIG. 9, but illustrating the gas generator in an alternate, open position.

FIGS. 9 and 10 illustrate a further embodiment of the invention, which takes the form of a variant of the embodiment of FIGS. 7 and 8. Indeed, it will be seen that the pivot pins 26 of the gas generator 23 and their respective associated sockets formed on the base plate 8 are positioned in substantially the same position as for the embodiment illustrated in FIGS. 7 and 8 described above. Therefore, by the same principle as described above, upon actuation of the gas generator 23, the resultant torque acting on the gas generator 23 due to the build up of pressure within the air-bag 21 acts to urge the gas generator 23 towards its open position.

In this embodiment the actuable release mechanism is replaced with a retainer in the form of a frangible element 41 provided fixed to the underside of the base plate 8 in the region of the upper lip 29 of the base plate 8. The second edge region 33 of the gas generator 23 is thus sandwiched between the frangible element 41 and the upper lip 29 of the base plate 8. With the frangible element 41 in this position it will therefore be seen that pivotal movement of the gas generator 23 away from its closed position, as illustrated in FIG. 9, is prevented. Therefore, the gas generator 23 is retained in the closed position.

The arrangement of FIGS. 9 and 10 also differs from the embodiment illustrated in FIGS. 7 and 8, in that the lower lip 31, on the opposite side of the vent aperture 9 to the frangible element 41, is provided with a drive aperture 42.

It will be recalled that the air-bag unit 6 is mounted within the recess 5 of the steering wheel 1 which, in turn, is mounted to the steering column of a vehicle. In the embodiment of FIGS. 9 and 10, an opener in the form of an elongate element 43 is mounted on the steering column or other structure of the vehicle. The elongate element 43 is aligned with the drive aperture 42 formed through the lower lip 31, and is sized so as to pass substantially freely through the drive aperture 42.

Upon actuation of the gas generator 23, gas pressure builds up within the air-bag 21 and a rising level of resultant torque is applied to the gas generator 23 tending to urge it towards the open position. However, the gas generator 23 is initially prevented from moving away from its closed position illustrated in FIG. 9 by the engagement of the second edge region 33 of the flange 25 with the frangible element 41.

At a predetermined level of impact by the driver of the vehicle with the air-bag 21, the steering wheel 1, and hence the gas generator 23, move towards the steering column such that the elongate element 43 passes through the drive aperture 42 and engages with the first edge region 32 of the flange plate 25. This engagement provides an additional torque to the gas generator 23 about the pivot axis 27 which increases the force applied by the second edge region 33 against the frangible retainer 41 to a predetermined level sufficient to break the frangible element 41, and thus permit the gas generator 23 to move to the open position as illustrated in FIG. 10.

Figure 11:
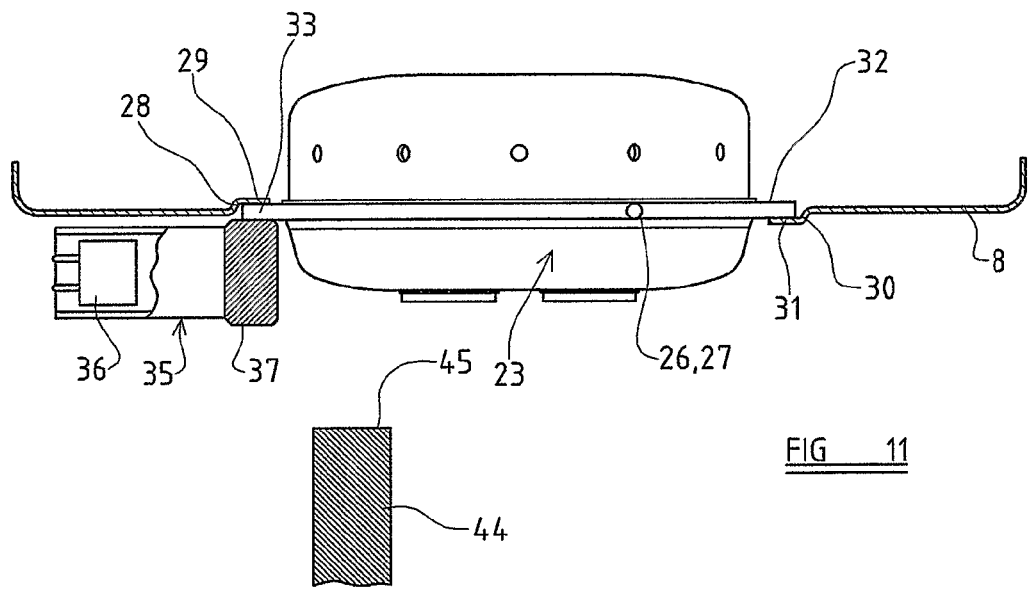
FIG. 11 is a transverse sectional view of a part of an arrangement in accordance with a still further embodiment of the invention, illustrating the gas generator in an initial, closed position.
Figure 12:
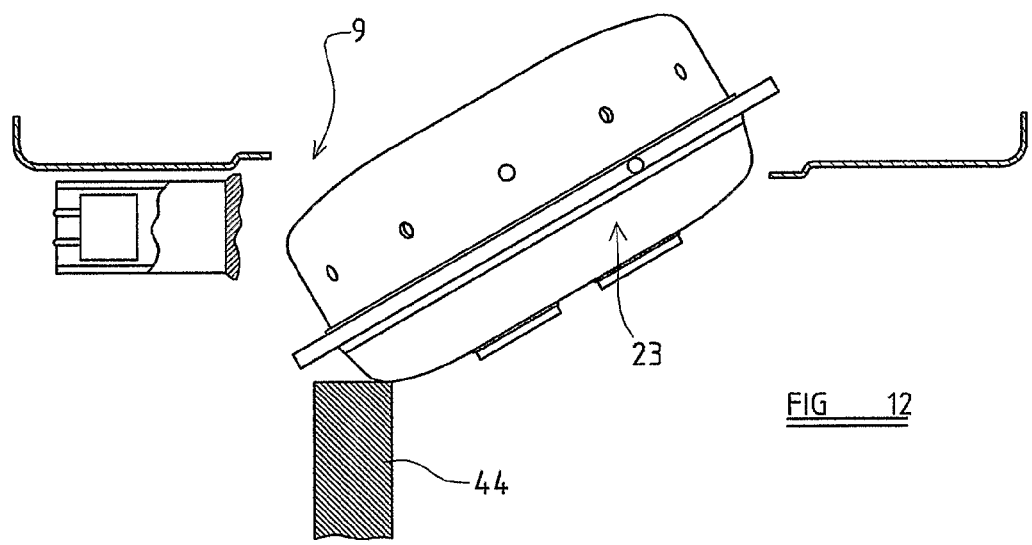
FIG. 12 is a view corresponding generally to FIG. 11, but illustrating the gas generator in an open position and in contact with a closing element.
Figure 13:
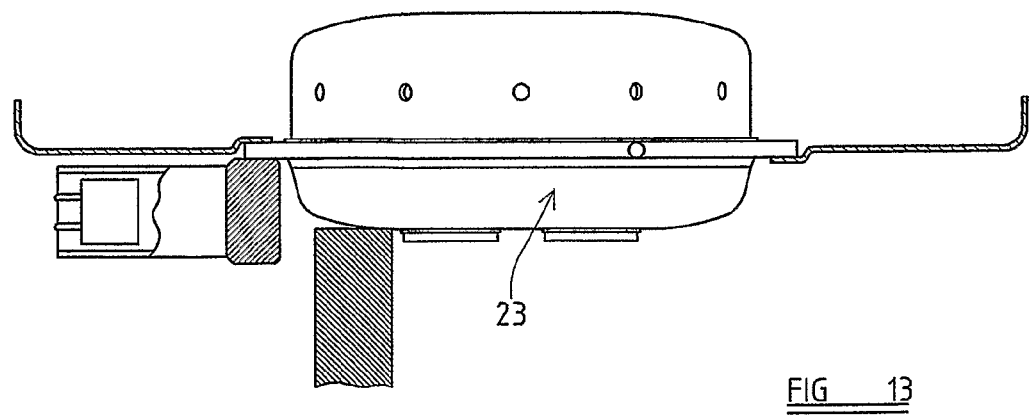
FIG. 13 is a view corresponding generally to FIG. 12, but illustrating the gas generator in a position in which it is closed again.

FIGS. 11, 12 and 13 illustrate a still further embodiment of the present invention which again is a close variant of the arrangement shown in FIGS. 7 and 8. This embodiment is provided with the same actuable release mechanism 35 as the arrangement of FIGS. 7 and 8. However, it differs from the arrangement illustrated in FIGS. 7 and 8 in that a closer in the form of an elongate element 44 is provided mounted on the steering column or other structure of the motor vehicle. The elongate closing element 44 is positioned so as to extend towards the vent aperture 9 between the pivot axis 27 and the upper lip 29 located immediately above the retainer 37. The elongate closing element 44 terminates with an end face 45 at a position spaced from the gas generator 23 when the gas generator 23 is located in its closed position.

Upon actuation of the gas generator 23, the air-bag 21 inflates. The squib 36 of the actuable release mechanism 35 may then be fired to release the gas generator 23 and enable it to move towards way its open position under the resultant torque from the gas pressure within the air-bag 21 and so to vent gas from the interior of the air-bag 21 through the vent aperture 9 to the atmosphere, as illustrated in FIG. 12.

However, at a predetermined level of impact by the driver of the vehicle with the air-bag 21, the steering wheel 1, and hence the gas generator 23, move relative to the structure of the motor vehicle towards the steering column such that the closing element 44 engages with the undersurface of the gas generator 23. Subsequent movement of the gas generator 23 relative to the closing element 44 serves to drive the gas generator 23 back towards the closed position, thus closing the vent aperture 9 and preventing any more gas from being vented from the interior of the air-bag 21, as illustrated in FIG. 13. This sort of arrangement allows an initial degree of venting from the air-bag 21 during the early stages of a crash, but then re-closes the vent aperture 9 to prevent excessive venting which can be disadvantageous.

Figure 14:
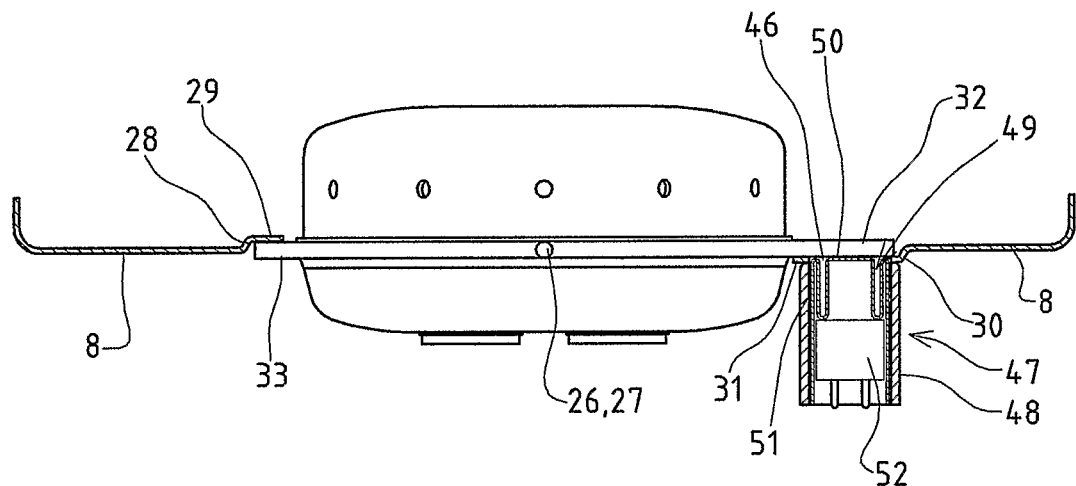
FIG. 14 illustrates a transverse sectional view of a part of an arrangement in accordance with another embodiment of the invention, illustrating the gas generator in its initial closed position and an expandable element release mechanism.
Figure 15:
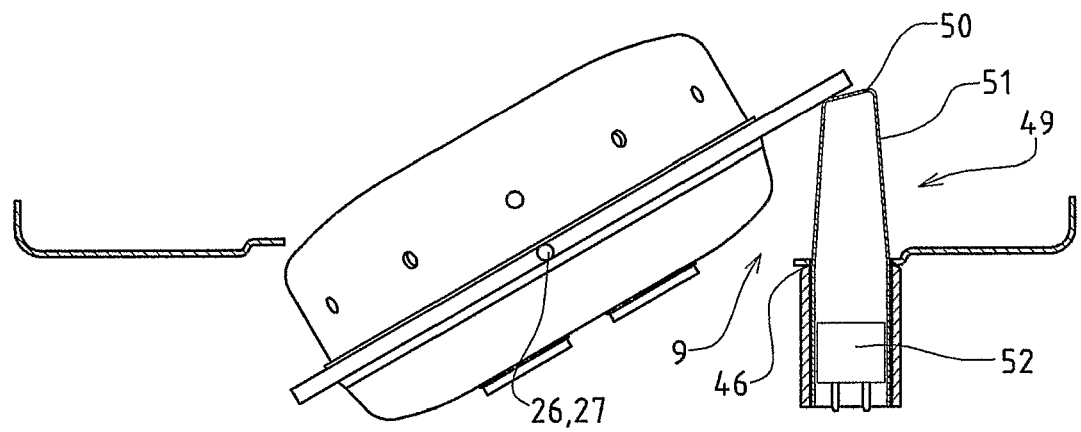
FIG. 15 is a view corresponding generally to FIG. 14, but illustrating the expandable element in its fully activated state and the gas generator, in an open position.

FIGS. 14 and 15 illustrate another embodiment of the present invention in which the pivot pins 26 of the gas generator 23 and their respective sockets formed on the base plate 8 are positioned so that the pivot axis 27 of the gas generator 23 extends substantially across the centre of the vent aperture 9 and through the central region of the gas generator 23. However, the downward step 30 of the lower lip 31 is located at a position further from the pivot axis 27 than the upward step 28 of the upper lip 29, such that when the gas generator 23 is in the closed position illustrated in FIG. 14, the effective area over which the pressure of the gas within the inflating air-bag 21 acts is the same, or greater on the side of the first edge region 32 than on the side of the second edge region 33 relative to the pivot axis 27.

The lower lip 31 is provided with a drive aperture 46, and an actuable opening mechanism 47 which is mounted on the underside of the lower lip 31. The actuable opening mechanism 47 comprises a cylindrical housing 48 which extends downwardly from the periphery of the drive aperture 46. Within the housing 48 there is provided an expandable element 49 in the form of an elongate tube closed at one end by a terminal stop face 50. The expandable element 49 could, for example, be made from flexible material such as elastomer, or alternatively, could be made from a mechanically deformable material such as metal.

It will be seen from FIG. 14 that when the gas generator 23 is in its closed position, part of the length of the expandable element is retained against the inner surface of the housing 48, and the remaining free length 51 of the elongate tube, which terminates in the stop face 50, is folded in on itself so as to accommodate the stop face 50 within the drive aperture 46 at a position adjacent the first edge region 32 of the flange plate 23.

The actuable opening mechanism 47 is also provided with a squib 52 which is provided within the lowermost region of the elongate tube, below the folded region at the top of the housing 48.

Upon actuation of the gas generator 23, the air-bag 21 inflates and an increasing pressure is applied to the inner surface of the gas generator 23 exposed to the interior of the air-bag 21 which acts to produce either a zero resultant torque, or a torque tending to urge the gas generator 23 to its closed position due to the relative proportions of the effective areas described above.

Upon receipt of a trigger signal, the squib 52 fires and generates gas to expand the expandable element 49 upwardly through the drive aperture 46, such that the stop face 50 bears against the first edge region 32 of the flange plate 25 and drives it upwardly so that the gas generator 23 is moved to the open position illustrated in FIG. 15.

It can be seen from FIG. 15 that the expandable element 49 is configured so that when it is in its fully expanded state, the plane of the stop face 50 is inclined towards the pivot axis 27. This inclination of the stop face 50 ensures that it remains in engagement with the flange plate 25 as it drives the gas generator 23 to the open position and that it does not slide off the edge of the flange plate 25.

It is to be appreciated that in this arrangement it is the expandable element 49 which is being utilised to drive the gas generator 23 to the open position, and not the resultant torque acting on the gas generator 23 due to internal pressure of the inflating gas. It is therefore preferable for the resultant torque due to the pressure of gas within the air-bag 21 to be substantially zero, or if it is not zero, to act in a sense effective to urge the gas generator 23 to its closed position but which can be overcome by the force of the activated expandable element 49.

It is envisaged that if the arrangement is configured such that the gas from the gas generator 23 exerts a zero resultant torque on the gas generator 23, then the gas generator 23 could be retained in the closed position by means of the frangible retainer 41 discussed above between the gas generator 23 and the base plate 8, which is configured to break when the force exerted on the gas generator 23 by the expandable element 49 exceeds a predetermined force.

Figure 16:
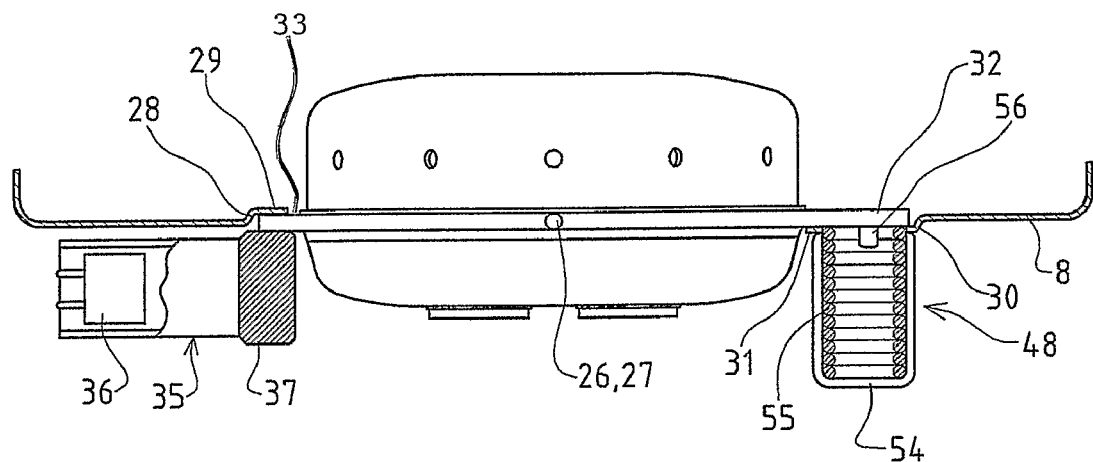
FIG. 16 is a transverse sectional view of a part of an arrangement in accordance with further embodiment of the invention, illustrating the gas generator in its initial closed position being retained by an actuable release mechanism.
Figure 17:
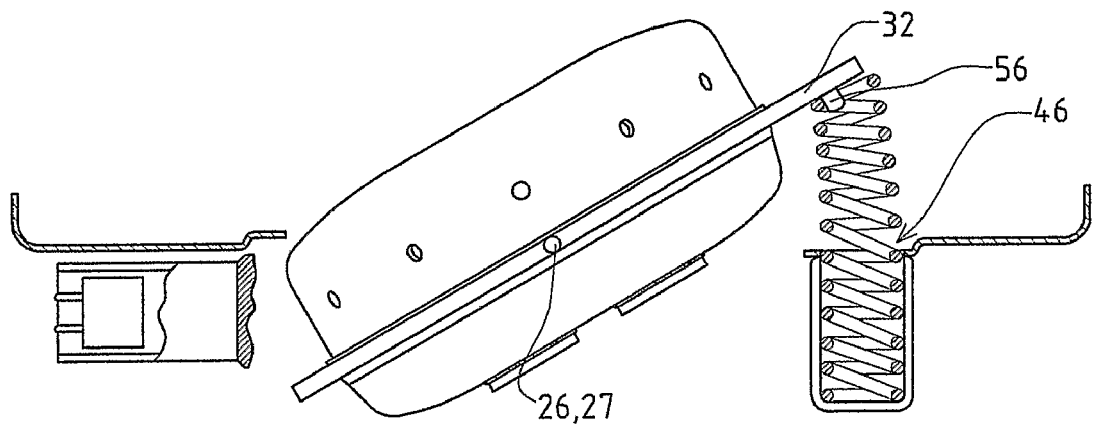
FIG. 17 is a view corresponding generally to FIG. 16, but illustrating the actuable release mechanism in its released state and the gas generator in its open position.

FIGS. 16 and 17 illustrate a further embodiment of the invention, which is a variant of the embodiment illustrated in FIGS. 14 and 15. In this arrangement, the underside of the base plate 8 is provided with an actuable release mechanism 35 which is substantially identical to the release mechanism described above with reference to FIGS. 7 and 8. The actuable release mechanism 35 is again provided in the region of the upper lip 29 in a position effective to sandwich the second region 33 of the flange plate 25 between the retainer 37 of the release mechanism 35 and the upper lip 29 of the base plate 8.

The lower lip 31 of the base plate 8 is again provided with a drive aperture 46 which is substantially identical to the drive aperture of the arrangement shown in FIGS. 14 and 15. Beneath the drive aperture 46 there is provided an opening mechanism 53 which again comprises a cylindrical housing 48. The cylindrical housing 48 is closed at its lower end by a lower end wall 54.

Within the housing 48, there is provided an expandable element 55 which takes the form of a helically wound compression spring. As will be appreciated, FIG. 16 illustrates the gas generator 23 in its closed position and in this position, the spring 55 is substantially fully compressed such that the successive winds of the spring bear against one another. It will be appreciated that the lowermost wind of the spring 55 bears against the lower end wall 54, and with the gas generator 23 in its closed position, the uppermost wind of the spring 55 bears against the undersurface of the first edge region 32 of the flange plate 25, through the drive aperture 46. The spring 55 has a diameter appropriate to allow the spring to pass substantially freely through the drive aperture 46.

The underside of the first edge region 32 of the flange plate 25 is provided with a downwardly-projecting locating stud 56 which is located so as to project through the uppermost wind of the spring 55.

In operation of the arrangement illustrated in FIGS. 16 and 17, the gas generator 23 is again initially actuated upon receipt of an appropriate firing signal, whereupon a large volume of gas is provided to the interior of the air-bag 21. Subsequent actuation of the release mechanism 35 releases the gas generator 23 from its initial closed position, whereupon the initially-compressed spring 55 becomes free to expand under its inherent bias, as illustrated in FIG. 17. The spring 55 thus serves to drive the first edge region 32 of the flange plate 25 and the lower end wall 54 of the housing 48 apart from one another. The spring 55 thus drives the gas generator 23 towards it open position illustrated in FIG. 17.

As illustrated in FIG. 17, as the gas generator 23 rotates towards its fully opened position, the locating stud 56 moves from an initial position located substantially centrally within the terminal wind of the spring to a position at which it bears against part of the terminal wind of the spring 55. The locating stud 56 thus serves to prevent the upper end of the spring 55 from sliding off the edge of the flange plate 25.

It is to be appreciated that in all of the above mentioned embodiments of the invention, the relative position of the pivot axis across the vent aperture 9, and the shape of the vent aperture 9 can be varied to optimise both the direction and the desired level of resultant torque acting on the gas generator 23 during inflation of the air-bag 21.

In the present Specification "comprises" means "includes or consists of" and "comprising" means "including or consisting of".

The features disclosed in the foregoing description, or the following Claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An air-bag arrangement comprising:
an air-bag; an aperture communicating with the interior of the air-bag; and a gas generator to generate gas to inflate the air-bag; wherein the gas generator is mounted for pivotal movement such that the gas generator is pivotally moveable between a closed position in which at least part of the gas generator extends across the aperture to close the aperture, and an open position in which said aperture is opened to permit the flow of gas from the air-bag, characterized in that the gas generator is mounted for said pivotal movement about a pivot-axis extending across the aperture.

2. An air-bag arrangement according to claim 1, wherein the gas generator is mounted such that, during movement from its closed position to its open position, part of the gas generator moves inwardly of the aperture and part of the gas generator moves outwardly of the aperture.

3. An air-bag arrangement according to claim 1, wherein the gas generator is configured so that gas pressure within the airbag resulting from actuation of the gas generator creates a resultant torque acting to urge the gas generator from its closed position towards its open position.

4. An air-bag arrangement according to claim 1, wherein the gas generator is configured so that gas pressure within the airbag resulting from actuation of the gas generator creates a substantially zero resultant torque acting on the gas generator when the gas generator is in its closed position.

5. An air-bag arrangement according to claim 1, wherein the aperture is formed through an element, said element presenting an inner surface towards the interior of the air-bag, said gas generator having an outwardly directed flange region on one side of the pivot-axis which engages the inner surface when the gas generator is in the closed position.

6. An air-bag arrangement according to claim 5, wherein the gas generator is provided with a second outwardly directed flange region on the other side of the pivot-axis which engages an outer surface of the element when the gas generator is in the closed position.

7. An air-bag arrangement according to claim 5, wherein the pivot-axis cuts the area presented by the aperture into two unequal areas, the smaller area being on the same side of the pivot-axis as the first flange region.

8. An air-bag arrangement according to claim 1, wherein the aperture is substantially square.

9. An air-bag arrangement according to claim 1 provided with a retainer to hold the gas generator in the closed position.

10. An air-bag arrangement according to claim 9, wherein the retainer is releasable, and is actuable in response to a signal so as to release and allow the gas generator to move to the open position.

11. An air-bag arrangement according to claim 9, wherein the retainer comprises at least one frangible element which is configured to break in response to a predetermined torque acting on the gas generator.

12. An air-bag arrangement according to claim 1, wherein the arrangement is provided with an opening arrangement to drive the gas generator from the closed position to at least a partially open position.

13. An air-bag arrangement according to claim 12, wherein the opening arrangement comprises an expandable element which is actuable in response to a signal.

14. An air-bag arrangement according to claim 12, wherein the opening arrangement comprises a spring.

15. An air-bag arrangement according to claim 12, wherein the air-bag arrangement is provided in a vehicle steering wheel mounted to the structure of the vehicle, said opening arrangement comprising an element forming part of the structure and being configured to drive the gas generator from the closed position to at least said partially open position in response to relative motion between the steering wheel and the structure of the vehicle.

16. An air-bag arrangement according to claim 1, wherein the air-bag arrangement is provided in a vehicle steering wheel 1 mounted to the structure of the vehicle, said structure being provided with an element configured to drive the gas generator 23 from an at least partially open position to a substantially closed position in response to relative motion between the steering wheel 1 and the structure of the vehicle.

* * * * *